US011050942B2

(12) United States Patent
Chen (10) Patent No.: US 11,050,942 B2
(45) Date of Patent: Jun. 29, 2021

(54) SCREEN FILL LIGHT PHOTOGRAPHING METHOD FOR MOBILE TERMINAL, SYSTEM AND MOBILE TERMINAL

(71) Applicant: TCL Communications (Ningbo) Co., Ltd., Ningbo (CN)

(72) Inventor: Jianqiang Chen, Ningbo (CN)

(73) Assignee: TCL Communications (Ningbo) Co., Ltd., Ningbo (CN)

( * ) Notice: Subject to any disclaimer, the term of this patent is extended or adjusted under 35 U.S.C. 154(b) by 81 days.

(21) Appl. No.: 16/484,460

(22) PCT Filed: Jan. 31, 2018

(86) PCT No.: PCT/CN2018/074798
§ 371 (c)(1),
(2) Date: Aug. 8, 2019

(87) PCT Pub. No.: WO2018/145597
PCT Pub. Date: Aug. 16, 2018

(65) Prior Publication Data
US 2019/0356831 A1   Nov. 21, 2019

(30) Foreign Application Priority Data
Feb. 8, 2017 (CN) .......................... 201710069823.3

(51) Int. Cl.
*H04N 5/235* (2006.01)
*H04N 5/232* (2006.01)

(52) U.S. Cl.
CPC ......... *H04N 5/2351* (2013.01); *H04N 5/2354* (2013.01); *H04N 5/23216* (2013.01); *H04N 5/23229* (2013.01)

(58) Field of Classification Search
CPC ............. H04N 5/2351; H04N 5/23216; H04N 5/23229; H04N 5/2354; H04N 5/23293
See application file for complete search history.

(56) References Cited

U.S. PATENT DOCUMENTS

| 8,837,829 | B2 * | 9/2014 | Shimizu | G09G 3/3406 382/168 |
| 9,965,999 | B1 * | 5/2018 | Barnes | G09G 3/3413 |
| 2005/0271379 | A1 * | 12/2005 | Lee | H04N 5/2351 396/234 |
| 2007/0013806 | A1 | 1/2007 | Kao | |
| 2008/0074510 | A1 * | 3/2008 | Chen | H04N 5/243 348/234 |

(Continued)

FOREIGN PATENT DOCUMENTS

| CN | 101179662 | 5/2008 |
| CN | 105554413 | 5/2016 |

(Continued)

*Primary Examiner* — Lin Ye
*Assistant Examiner* — John H Morehead, III (57) ABSTRACT

A screen fill light photographing method and system for a mobile terminal includes detecting a first luminance information of a current environment, comparing the same with a luminance threshold, controlling, according to the comparison result, a powered-on or powered-off state of a screen fill light mode; and according to the state of the screen fill light mode, performing corresponding image processing of a photo.

15 Claims, 4 Drawing Sheets

(56) References Cited

U.S. PATENT DOCUMENTS

| | | | | |
|---|---|---|---|---|
| 2010/0271507 | A1* | 10/2010 | Hung | H04N 5/23219 348/231.99 |
| 2011/0043534 | A1* | 2/2011 | Cheng | G09G 3/3406 345/589 |
| 2013/0051617 | A1* | 2/2013 | Chen | G06T 7/136 382/103 |
| 2013/0222346 | A1* | 8/2013 | Chen | G06F 3/0425 345/175 |
| 2015/0181102 | A1* | 6/2015 | Oda | H04N 5/2351 348/229.1 |
| 2016/0028965 | A1* | 1/2016 | Horii | H04N 5/225 348/333.01 |
| 2016/0063927 | A1* | 3/2016 | Li | G09G 3/3406 315/297 |
| 2017/0171445 | A1* | 6/2017 | Wang | H04N 5/2354 |
| 2018/0122335 | A1* | 5/2018 | Chen | H04M 1/72403 |
| 2018/0198971 | A1* | 7/2018 | Watanabe | G03B 3/10 |
| 2018/0308434 | A1* | 10/2018 | Nakanishi | F21S 2/00 |
| 2018/0352132 | A1* | 12/2018 | Tan | H04N 5/2351 |

FOREIGN PATENT DOCUMENTS

| | | |
|---|---|---|
| CN | 105719611 | 6/2016 |
| CN | 105979125 | 9/2016 |
| CN | 106603929 | 4/2017 |

\* cited by examiner

SCREEN FILL LIGHT PHOTOGRAPHING METHOD FOR MOBILE TERMINAL, SYSTEM AND MOBILE TERMINAL

RELATED APPLICATIONS

This application is a National Phase of PCT Patent Application No. PCT/CN2018/074798 having International filing date of Jan. 31, 2018, which claims the benefit of priority of Chinese Patent Application No. 201710069823.3 filed on Feb. 8, 2017. The contents of the above applications are all incorporated by reference as if fully set forth herein in their entirety.

FIELD AND BACKGROUND OF THE INVENTION

The present disclosure relates to the field of mobile terminal technologies, and more particularly, to a screen fill light photographing method for a mobile terminal, a system, and a mobile terminal.

In a shooting process of cameras, due to optical properties of lens and assembly technologies of the lens and sensors of the cameras, defects of high luminance on center and low luminance on edges are appeared in photos in different degrees, and in different luminance of lights, the degrees of the defects of high luminance and low luminance are different. In existing technologies, methods used to deal with the defects are adding digital gains around the original photos through image processing chips of phones, which make the center and the edges of the processed photos have a same luminance, and the methods are performed by dark corner modules. However, the digital gains lead to noises on the edges louder than noises on the center of the processed photos after screens are processed by fill light.

Therefore, the existing technologies needs further improvement and development.

SUMMARY OF THE INVENTION

An object of the present disclosure is to provide a screen fill light photographing method for a mobile terminal, a system, and a mobile terminal to solve problems of low luminance on center and high luminance on edges of a screen display when using screen fill light, and high luminance on center and low luminance on edges of a photo in a reverse complementary imaging process. Besides, a problem of extra noises produced in a screen fill light process in the existing technologies can be solved without using a dark corner module.

To achieve the above object, an embodiment of the present disclosure provides a mobile terminal. The mobile terminal includes a processor and a memory configured for storing data and instructions executable by the processor to perform following operations:
  detecting a first luminance information of a current environment;
  comparing the first luminance information with a luminance threshold;
  compensating luminance uniformity of a screen display if the first luminance information is less than the luminance threshold;
  performing a second image processing procedure to a photo after the luminance uniformity of the screen display is adjusted.

In an embodiment of the present disclosure, before the operation of detecting the first luminance information of the current environment, further including:
  setting the luminance threshold of environment luminance, a first environment luminance value, and a second environment luminance value in a camera, wherein the first environment luminance value is less than the second environment luminance value, and the second environment luminance value is less than the luminance threshold.

In an embodiment of the present disclosure, after the operation of comparing the first luminance information with the luminance threshold, further including:
  turning off a screen fill light mode if the first luminance information is greater than or equal to the luminance threshold.

In an embodiment of the present disclosure, after the operation of turning off the screen fill light mode, further including:
  performing a first image processing procedure to the photo when the screen fill light mode is turned off.

In an embodiment of the present disclosure, the operation of compensating the luminance uniformity of the screen display includes:
  displaying the screen display of the luminance uniformity $B=1/A=143\%$ on a screen, and luminance uniformity of the photo is $A=70\%$ if the first luminance information is less than the first environment luminance value;
  displaying the screen display of the luminance uniformity $B=1/A=167\%$ on the screen, and the luminance uniformity of the photo is $A=60\%$ if the first luminance information is greater than the first environment luminance value and less than the second environment luminance value;
  displaying the screen display of the luminance uniformity $B=1/A=200\%$ on the screen, and the luminance uniformity of the photo is $A=50\%$ if the first luminance information is greater than the second environment luminance value and less than the luminance threshold.

In an embodiment of the present disclosure, the second image processing procedure excludes image processing algorithms of a dark corner processing module.

In an embodiment of the present disclosure, the first image processing procedure includes image processing algorithms of a dark corner processing module.

In an embodiment of the present disclosure, an optical filter is in front of a camera when the photo is taken, and lights processed by the optical filter and entered into the camera become lights with luminance uniformity of light source.

In an embodiment of the present disclosure, the optical filter is a frosted sheet.

In an embodiment of the present disclosure, the luminance uniformity of the screen display is an inverse ratio to the luminance uniformity of the photo.

An embodiment of the present disclosure further provides a flexible circuit board. The flexible circuit board includes a screen fill light photographing method for a mobile terminal, the method includes:
  detecting a first luminance information of a current environment;
  comparing the first luminance information with a luminance threshold, and controlling an on or off state of a screen fill light mode based on a result of the comparation between the first luminance information and the luminance threshold;

performing a corresponding image processing procedure to a photo based on the state of the screen fill light mode.

In an embodiment of the present disclosure, before the step of detecting the first luminance information of the current environment, further including:

setting the luminance threshold of environment luminance, a first environment luminance value, and a second environment luminance value in a camera; wherein the first environment luminance value is less than the second environment luminance value, and the second environment luminance value is less than the luminance threshold.

In an embodiment of the present disclosure, the step of comparing the first luminance information with the luminance threshold, and controlling the on or off state of the screen fill light mode based on the result of the comparison between the first luminance information and the luminance threshold includes:

comparing the first luminance information with the luminance threshold;

turning on the screen fill light mode and displaying a screen display if the first luminance information is less than the luminance threshold;

turning off the screen fill light mode if the first luminance information is greater than or equal to the luminance threshold.

In an embodiment of the present disclosure, the step of performing the corresponding image processing procedure to the photo based on the state of the screen fill light mode includes:

performing a first image processing procedure to the photo when the screen fill light mode is turned off;

adjusting fill light to a screen display through inverse luminance compensation when the screen fill light mode is turned on and performing a second image processing procedure to the photo after the adjustment is finished.

In an embodiment of the present disclosure, the inverse luminance compensation includes:

displaying a first screen display after the screen display is performed the inverse luminance compensation if the first luminance information is less than the first environment luminance value;

displaying a second screen display after the screen display is performed the inverse luminance compensation if the first luminance information is greater than the first environment luminance value and less than the second environment luminance value;

displaying a third screen display after the screen display is performed the inverse luminance compensation if the first luminance information is greater than the second environment luminance value and less than the luminance threshold.

In an embodiment of the present disclosure, the first image processing procedure includes image processing algorithms of a dark corner processing module. The second image processing procedure excludes image processing algorithms of the dark corner processing module.

An embodiment of the present disclosure further provides a screen fill light photographing system for a mobile terminal. The system includes one or more processors, a memory, and one or more programs stored in the memory and executable by the processor. The one or more programs includes:

a luminance detecting module, configured for detecting a first luminance information of a current environment;

a comparing judgment module, configured for comparing the first luminance information with a luminance threshold, and controlling an on or off state of a screen fill light mode based on a result of the comparison between the first luminance information and the luminance threshold;

an image processing module, configured for performing a corresponding image processing procedure to a photo based on the state of the screen fill light mode.

In an embodiment of the present disclosure, the system further includes:

a setting module, configured for setting the luminance threshold of environment luminance, a first environment luminance value, and a second environment luminance value in a camera; wherein the first environment luminance value is less than the second environment luminance value, and the second environment luminance value is less than the luminance threshold.

In an embodiment of the present disclosure, the comparing judgment module includes:

a luminance comparing unit, configured for comparing the first luminance information with the luminance threshold;

a screen fill light unit, configured for turning on the screen fill light mode and displaying a screen display if the first luminance information is less than the luminance threshold;

a fill light turning off unit, configured for turning off the screen fill light mode if the first luminance information is greater than or equal to the luminance threshold.

In an embodiment of the present disclosure, the image processing module includes:

a first image processing module, configured for performing a first image processing procedure to the photo when the screen fill light mode is turned off;

a second image processing module, configured for adjusting fill light to a screen display through inverse luminance compensation when the screen fill light mode is turned on and performing a second image processing procedure to the photo after the adjustment is finished.

An object of the present disclosure is to provide a screen fill light photographing method for a mobile terminal, a system, and a mobile terminal. The method solves the problems of low luminance on center and high luminance on edges of a screen display when using screen fill light, and high luminance on center and low luminance on edges of a photo in a reverse complementary imaging process. By displaying different fill light photos on a screen, a camera defect of high luminance on the center and low luminance on the edges of the photo can be overcome without using a picture processing module, which achieves a great fill light imaging effect and avoids extra noise caused by calibration dark corner algorithms of the picture processing module.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
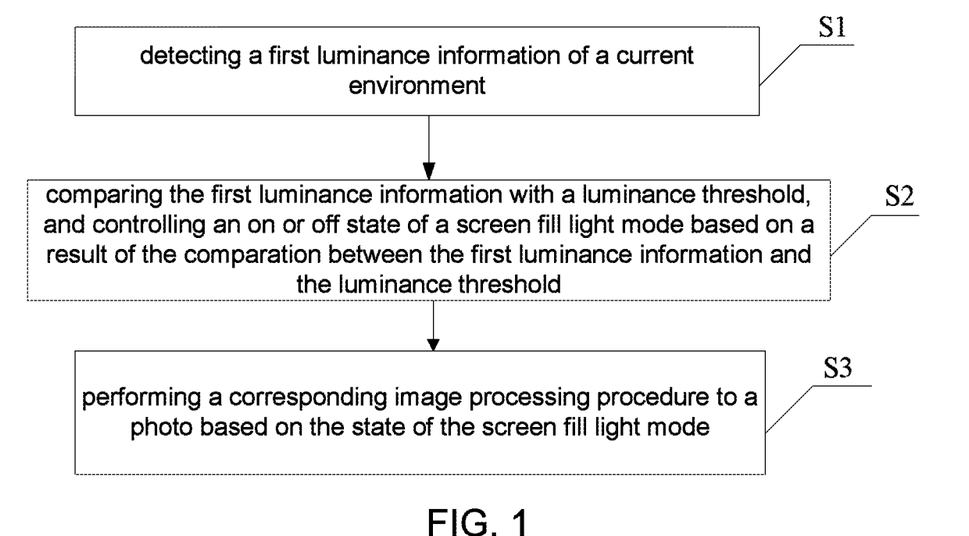
FIG. 1 is a flowchart of a screen fill light photographing method for a mobile terminal according to an embodiment of the present disclosure.

During lights reflected from an object pass through a lens and are imaged on an optical sensor, defects of high luminance on center and low luminance on edges are appeared in photos in different degrees, therefore screen displays are performed reverse luminance complementary to make the luminance of the photos uniform. An object of the present disclosure is to provide a screen fill light photographing method for a mobile terminal. FIG. 1 is a flowchart of a screen fill light photographing method for a mobile terminal according to an embodiment of the present disclosure. The method includes:

Step S1, detecting a first luminance information of a current environment;

Step S2, comparing the first luminance information with a luminance threshold, and controlling an on or off state of a screen fill light mode based on a result of the comparison between the first luminance information and the luminance threshold;

Step S3, performing a corresponding image processing procedure to a photo based on the state of the screen fill light mode.

Whether to perform screen fill light is judged on the first luminance information of the current environment, and different screen displays are displayed for different environment luminance values. Therefore, related parameters should be set before photographing: setting the luminance threshold Es of an environment luminance, a first environment luminance value e1, and a second environment luminance value e2 in a camera. The first environment luminance value e1 is less than the second environment luminance value e2, and the second environment luminance value e2 is less than the luminance threshold Es.

A luminance detecting module is opened to detect the first luminance information E of the current environment in photographing. The luminance detecting module reads the first luminance information E through an optical sensor of a phone camera. Whether to perform the screen fill light is judged on comparison between the first luminance information and the luminance threshold. The step S2 includes:

Step 21, comparing the first luminance information with the luminance threshold.

Step 22, performing screen fill light and displaying the screen display if the first luminance information is less than the luminance threshold.

It indicates that luminance of the environment is low if the first luminance information E of the current environment is less than the luminance threshold Es when turning on phone screen fill light, therefore the screen needs fill light. For different environment luminance information, the screen display is adjusted to perform different fill lights through inverse luminance compensation, and displays different screen displays. For the luminance threshold Es, the first environment luminance value e1, and the second environment luminance value e2 set in a camera, the first environment luminance value e1 is less than the second environment luminance value e2, and the second environment luminance value e2 is less than the luminance threshold Es.

The environment luminance information can be divided into three ranges: E<e1; e1<=E<=e2; e2<E<Es. If the first luminance information E is less than the first environment luminance value e1, a first screen display is displayed after the screen display is performed the inverse luminance compensation; if the first luminance information E is greater than the first environment luminance value e1 and less than the second environment luminance value e2, a second screen display is displayed after the screen display is performed the inverse luminance compensation; if the first luminance information E is greater than the second environment luminance value e2 and less than the luminance threshold Es, a third screen display is displayed after the screen display is performed the inverse luminance compensation.

Figure 2:
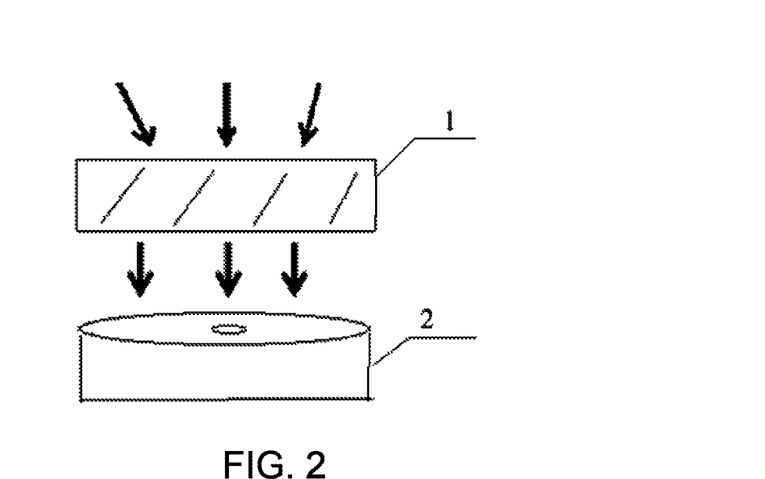
FIG. 2 is a flowchart of a photographing method according to an embodiment of the present disclosure.

In an embodiment of the present disclosure, an optical filter is in front of the camera when the photo is taken, the optical filter is a frosted sheet. FIG. 2 is a diagram of a photographing method according to an embodiment of the present disclosure. Lights processed by the optical filter 1 and entered into the camera 2 become lights with luminance uniformity of a light source. A function of the optical filter is to make sure that external lights processed by the optical filter become lights with luminance uniformity, which avoid uneven luminance of the photo result from uneven luminance of the light source.

Luminance compensation on the edges of the photo depends on attenuation of the luminance on the edges relative to the luminance on the center of the photo taken by the camera in different environment luminance. Luminance values of the edges and the center of the photo and the screen display can be shown in a diagram of luminance values of the photo of FIG. 3 and a diagram of luminance values of the screen display of FIG. 4 after photographing. When the screen display performs the inverse luminance compensation, the luminance uniformity of the screen display is compensated. The luminance uniformity of the screen display is an inverse ratio to the luminance uniformity of the photo. Referring to the FIG. 3, the luminance uniformity A of the photo can be figured out: A=(c1+c2+c3+c4)/(4*c5), and c1,c2,c3,c4,c5 are luminance values of four corners and central area of the photo correspondingly. The luminance uniformity A of the photo can be obtained by compensating the luminance uniformity B of the screen display, B=1/A. Referring to the FIG. 4, the luminance uniformity B of the screen display is B=(d1+d2+d3+d4)/(4*d5), and d1,d2,d3, d4,d5 are luminance values of four corners and central area of the screen display correspondingly.

Figure 3:
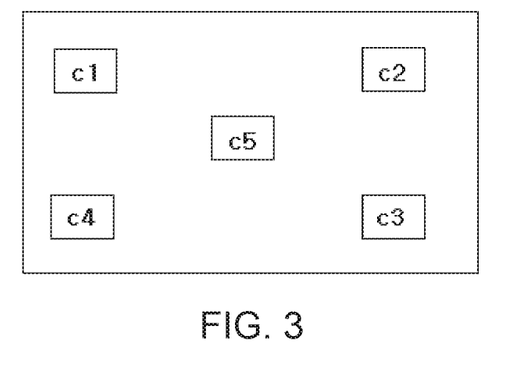
FIG. 3 is a diagram of luminance values of a photo according to an embodiment of the present disclosure.
Figure 4:
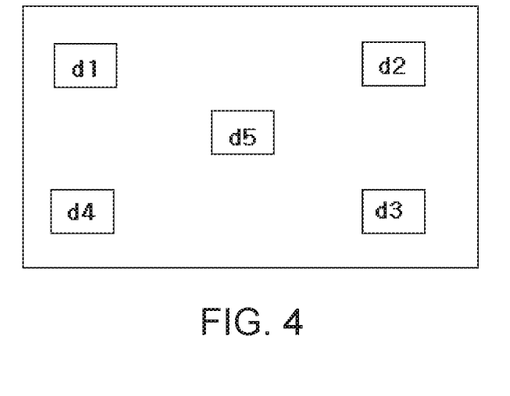
FIG. 4 is a diagram of luminance values of a screen display according to an embodiment of the present disclosure.

Below is an embodiment that the luminance uniformity of the photo in three different light sources transform to the luminance uniformity of the screen display.

Luminance uniformity of the photo is A=70% if E<e1, therefore the screen display of the luminance uniformity B=1/A=143% is displayed on the screen;

Luminance uniformity of the photo is A=60% if e1<=E<=e2, therefore the screen display of the luminance uniformity B=1/A=167% is displayed on the screen;

Luminance uniformity of the photo is A=50% if e2<E<Es, therefore the screen display of the luminance uniformity B=1/A=200% is displayed on the screen.

The screen display becomes a picture with a same luminance on the edge and the center after the luminance uniformity of the screen display is adjusted.

Different screen displays are displayed with different luminance information of the current environment. The photo is performed a second image processing procedure after screen fill light adjustment is finished. The second image processing procedure excludes image processing algorithms of the dark corner processing module. Therefore, the photographing method can realize the luminance uniformity of the photo, and not use the dark corner processing module, which avoids extra noises caused by calibration dark corner algorithms of a picture processing module.

Step 23, turning off the screen fill light mode if the first luminance information is greater than or equal to the luminance threshold.

It indicates that the environment luminance is high if the first luminance information E is greater than or equal to the luminance threshold, therefore screen fill light is not needed. The photo is performed a normal first image processing procedure, and the first image processing procedure includes image processing algorithms of the dark corner processing module. The dark corner processing module means to add digital gains around the original photos through image processing chips of phones, which make the center and the edges of the processed photos to have the same luminance. However, the digital gains lead to noises on the edges louder than noises on the center of the processed photo after using the dark corner processing module.

Above all, the screen fill light photographing method of the present disclosure is only for luminance compensation with the environment luminance of shooting environment less than the luminance threshold.

Figure 5:
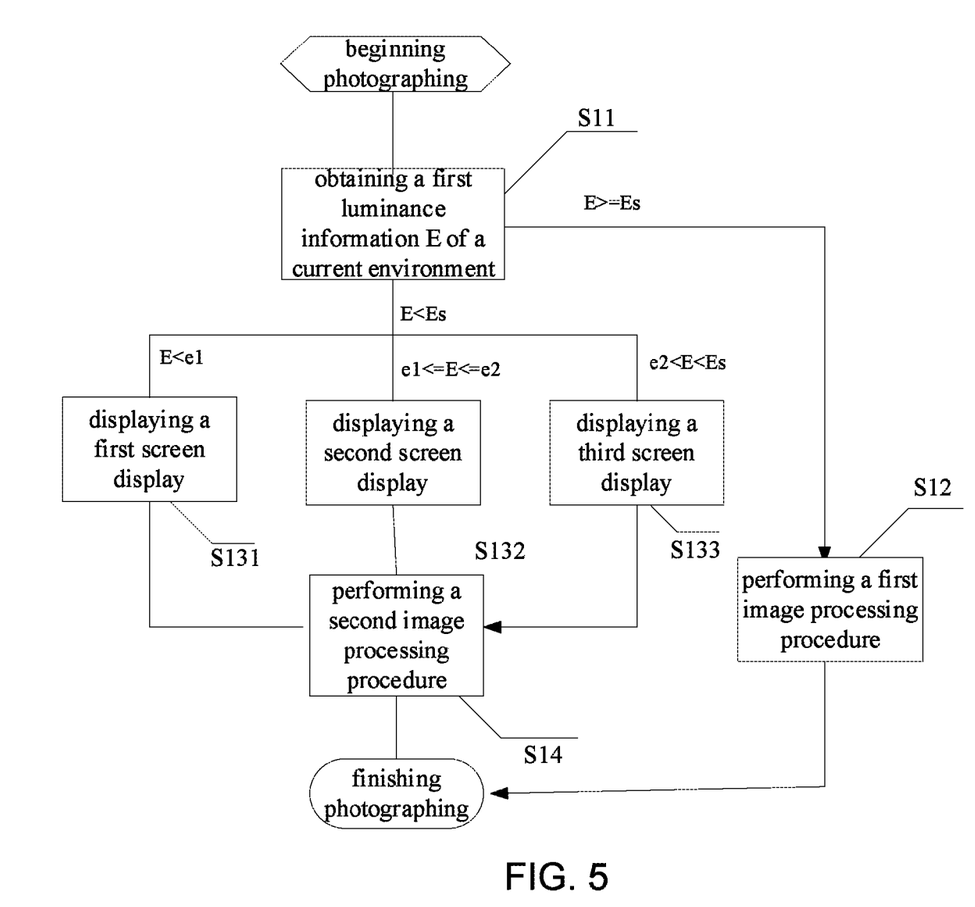
FIG. 5 is a flowchart of a screen fill light photographing method for a mobile terminal according to a specific embodiment of the present disclosure.

According to the screen fill light photographing method for the mobile terminal above, referring to FIG. 5, the present disclosure provides a flowchart of a screen fill light photographing method for a mobile terminal.

Step S11, obtaining a first luminance information E of a current environment;

Step S12, turning off the screen fill light mode and performing a first image processing procedure to the photo if the first luminance information E is greater than or equal to the luminance threshold Es;

Step 131, displaying a first screen display after the screen display is performed the inverse luminance compensation if the first luminance information is less than the first environment luminance value;

Step 132, displaying a second screen display after the screen display is performed the inverse luminance compensation if the first luminance information is greater than the first environment luminance value and less than the second environment luminance value;

Step 133, displaying a third screen display after the screen display is performed the inverse luminance compensation if the first luminance information is greater than the second environment luminance value and less than the luminance threshold;

Step 14, performing a second image processing procedure to the photo.

Figure 6:
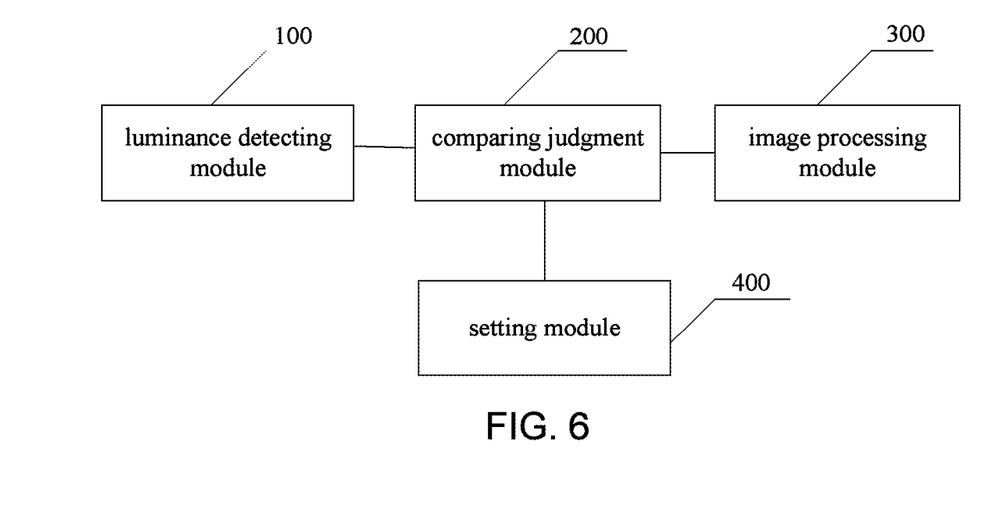
FIG. 6 is a structural diagram of a screen fill light photographing system for a mobile terminal according to an embodiment of the present disclosure.

According to the screen fill light photographing method for the mobile terminal above, the present disclosure further provides a screen fill light photographing system for a mobile terminal. FIG. 6 is a structural diagram of a screen fill light photographing system for a mobile terminal according to an embodiment of the present disclosure. The system includes:

A luminance detecting module 100, configured to detect a first luminance information of a current environment; more specific details are as above.

A comparing judgment module 200, configured to compare the first luminance information with a luminance threshold, and to control an on or off state of a screen fill light mode based on a result of the comparison between the first luminance information and the luminance threshold; more specific details are as above.

An image processing module 300, configured to perform a corresponding image processing procedure to a photo based on the state of the screen fill light mode; more specific details are as above.

A setting module 400, configured to set the luminance threshold of environment luminance, a first environment luminance value, and a second environment luminance value in a camera. The first environment luminance value is less than the second environment luminance value, and the second environment luminance value is less than the luminance threshold; more specific details are as above.

The comparing judgment module 200 includes:

A luminance comparing unit, configured to compare the first luminance information with the luminance threshold; more specific details are as above.

A screen fill light unit, configured to turn on the screen fill light mode and displaying a screen display if the first luminance information is less than the luminance threshold; more specific details are as above.

A fill light turning off unit, configured to turn off the screen fill light mode if the first luminance information is greater than or equal to the luminance threshold; more specific details are as above.

The fill light turning off unit includes:

A first fill light subunit, configured to display a first screen display after the screen display is performed the inverse luminance compensation if the first luminance information is less than the first environment luminance value; more specific details are as above.

A second fill light subunit, configured to display a second screen display after the screen display is performed the inverse luminance compensation if the first luminance information is greater than the first environment luminance value and less than the second environment luminance value; more specific details are as above.

A third fill light subunit, configured to display a third screen display after the screen display is performed the inverse luminance compensation if the first luminance information is greater than the second environment luminance value and less than the luminance threshold; more specific details are as above.

An object of the present disclosure is to provide a screen fill light photographing method for a mobile terminal, and a system. The method solves the problems of low luminance on center and high luminance on edges of a screen display when using screen fill light, and high luminance on center and low luminance on edges of a photo in a reverse complementary imaging process. By displaying different fill light photos on a screen, a camera defect of high luminance on the center and low luminance on the edges of the photo can be overcome without using a picture processing module, which achieves a great fill light imaging effect and avoids extra noise caused by calibration dark corner algorithms of the picture processing module.

An embodiment of the present disclosure further provides a memory configured for storing instructions executable by computer to perform the screen fill light photographing method for the mobile terminal above.

A person of ordinary skill in the art understand that all or some of the steps of the embodiments may be implemented by hardware or a program instructing related hardware (such as a processor, a controller and so on). The program may be stored in a computer readable storage medium, the storage medium may include: a read-only memory, a magnetic disk, an optical disc, or the like.

Figure 7:
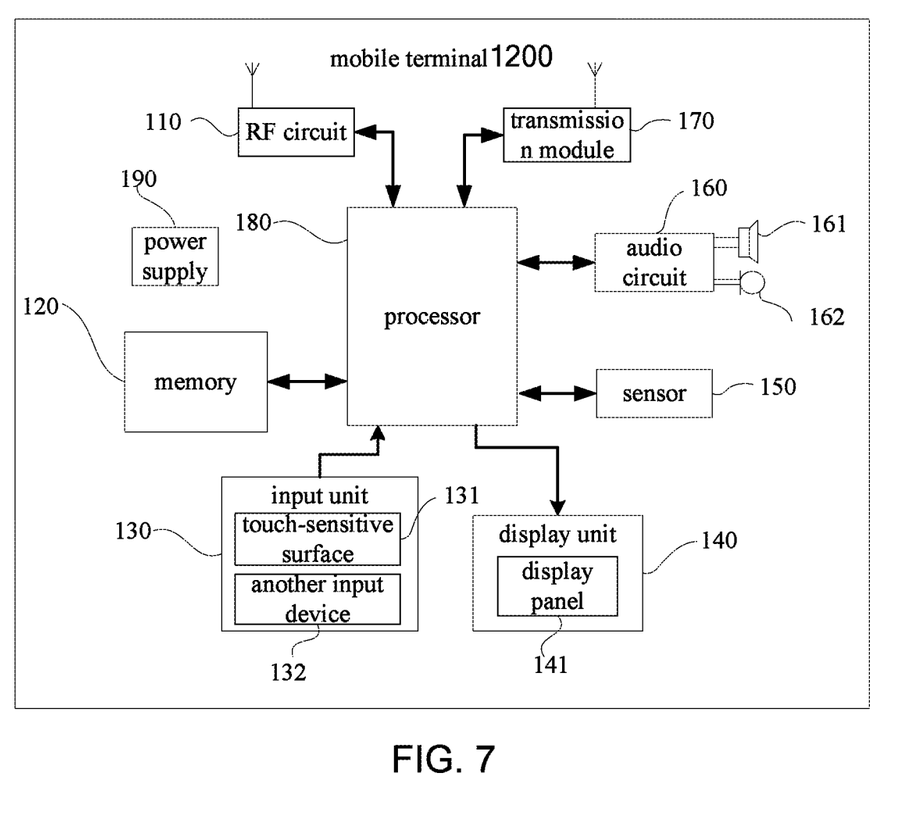
FIG. 7 is a structural diagram of a mobile terminal according to an embodiment of the present disclosure.

FIG. 7 is a structural diagram of a mobile terminal according to an embodiment of the present disclosure. The mobile terminal can be configured to realize the screen fill light photographing method for the mobile terminal, and the system provided by the above embodiments. The mobile terminal can be a smart phone or tablet computer.

Referring to the FIG. 7, the mobile terminal 1200 may include components, such as a radio frequency (RF) circuit 110, a memory 120 including one or more (only one is shown in the FIG. 7) computer readable storage media, an input unit 130, a display unit 140, a sensor 150, an audio circuit 160, a transmission module 170, a processor 180 including one or more (only one is shown in the FIG. 7) processing cores, and a power supply 190. A person skilled in the art may understand that the structure of the mobile terminal shown in FIG. 7 does not constitute a limitation to the mobile terminal. The mobile terminal may include more components or fewer components than those shown in the figure, or some components may be combined, or a different arrangement of components may be used.

The RF circuit 110 is configured to receive and send electromagnetic waves to realize conversion between the electromagnetic waves and electrical signals, which can communicate with communication network or another equipment. The RF circuit 110 can include all kinds of circuit components configured to execute the functions, such as an antenna, a radio frequency transceiver, a digital signal processor, encryption or decryption chip, a subscriber identity module (SIM) card, a memory, and so on. In addition, the RF circuit 110 may also communicate with all kinds of networks, such as Internet, intranet, wireless network, or communicate with another device by using wireless communication. The wireless communication may use any communication standards or protocols, which includes, but is not limited to, Global System for Mobile communications (GSM), Enhanced Data GSM Environment (EDGE), Wideband Code Division Multiple Access (WCDMA), Code Division Multiple Access (CDMA), Time Division Multiple Access (TDMA), Wireless Fidelity (WIFI), Voice over Internet Protocol (VoIP), Worldwide Interoperability for Microwave Access (Wi-Max), another protocol applied in mails or instant messaging, another appropriate protocol, even undeveloped protocols.

The memory 120 may be configured to store software programs and modules, such as the software programs or modules of above screen fill light photographing method for the mobile terminal and the system. The processor 180 runs the software programs and modules stored in the memory 120, to implement various functional applications and data processing, namely, to realize the screen fill light photographing function for the mobile terminal. In addition, the memory 120 may include a high speed random access memory (RAM), and may also include a non-volatile memory such as at least one magnetic disk storage device, a flash memory device, or another volatile solid-state storage device. Correspondingly, the memory 120 may further include a memory disposed remotely to the processor 180, the remote memory can be connected to the mobile terminal 1200 through networks. The networks include, but is not limited to, Internet, intranet, local area network, mobile radio communications, and any combination thereof.

The input unit 130 may be configured to receive input digit or character information, and generate a signal input, related to a user setting and function control, of a keyboard, a mouse, a joystick, an optical or trackball. Specifically, the input unit 130 may include a touch-sensitive surface 131 and another input device 132. The touch-sensitive surface 131, which may also be referred to as a touch display screen or a touch control panel, may collect a touch operation of a user on or near the touch-sensitive surface 131 (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives touch signal from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface acoustic wave touch-sensitive surface 131. In addition to the touch-sensitive surface 131, the input unit 130 may further include another input device 132. Specifically, the another input device 132 may include, but is not limited to, one or more of a physical keyboard, a functional key (such as a volume control key and a switch key), a trackball, a mouse, and a joystick.

The display unit 140 may be configured to display information input by the user or information provided to the user, and various graphical user interfaces of the mobile terminal 1200, where these graphical user interface may be composed of a graphic, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 sends the touch operation to the processor 180, so as to determine a type of a touch event. Then, the processor 180 provides a corresponding visual output on the display panel 141 according to the type of the touch event. In FIG. 7, the touch-sensitive surface 131 and the display panel 141 are used as two separate parts to implement input and output functions. However, in some embodiment, the touch-sensitive surface 131 and the display panel 141 may be integrated to implement the input and output functions.

The mobile terminal 1200 may further include at least one sensor 150, such as an optical sensor, a motion sensor, and other sensors. Specifically, the optical sensor may include an ambient light sensor and a proximity sensor, where the ambient light sensor may adjust luminance of the display panel 141 according to brightness of the ambient light, and the proximity sensor may switch off the display panel 141 and/or backlight when the mobile terminal 1200 is moved near the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), and a function related to vibration recognition (such as a pedometer and a knock), and the like. Other sensors, such as a gyroscope, a barometer, a hygrometer, a thermometer, and an infrared sensor that may be configured in the mobile terminal 1200 are not further described herein.

The audio circuit 160, a loudspeaker 161, and a microphone 162 may provide audio interfaces between the user and the mobile terminal 1200. The audio circuit 160 may convert received audio data into an electric signal and transmit the electric signal to the loudspeaker 161. The loudspeaker 161 converts the electric signal into a sound signal and output the sound signal. In another aspect, the microphone 162 converts a collected sound signal into an electric signal. The audio circuit 160 receives the electric signal, converts the electric signal into audio data, and outputs the audio data to the processor 180 for processing. Then, the processor 180 sends the audio data to another mobile terminal by using the RF circuit 110, or outputs the audio data to the memory 120 for further processing. The audio circuit 160 may further include an earplug jack for providing communication between a peripheral earphone and the mobile terminal 1200.

The mobile terminal 1200 may help, by using the short distance wireless transmission module 170, a user receive and send e-mails, browse a webpage, and access streaming media, and so on, which provides the user with wireless broadband Internet access. Although FIG. 7 shows the short distance wireless transmission module 170, it may be understood that the short distance wireless transmission module 170 is not an essential component of the mobile terminal 1200, and when required, the short distance wireless transmission module 170 may be omitted if the scope of the essence of the present disclosure is not changed.

The processor 180 is a control center of the mobile terminal 1200, and is connected to various parts of the entire mobile terminal by using various interfaces and lines. By running or executing the software programs and/or modules that are stored in the memory 120, and invoking data stored in the memory 120, the processor 180 performs various functions and data processing of the mobile terminal 1200, thereby performing overall monitoring on the mobile terminal. Optionally, the processor 180 may include one or more processing cores. Optionally, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The mobile terminal 1200 further includes the power supply 190 (such as a battery) for supplying power to the components. Preferably, the power supply may be logically connected to the processor 180 by using a power management system, thereby implementing functions, such as charging, discharging, and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the mobile terminal 1200 may further include a camera (such as front-facing camera, and rear camera), a BLUETOOTH module, and the like, which are not further described herein. In an embodiment, the display unit of the mobile terminal is a touchscreen display. The mobile terminal 1200 further includes a memory and one or more programs. The one or more programs are stored in the memory and are executable by the one or more processors to perform following operations:

detecting a first luminance information of a current environment;

comparing the first luminance information with a luminance threshold;

compensating luminance uniformity of a screen display if the first luminance information is less than the luminance threshold;

performing a second image processing procedure to a photo after the luminance uniformity of the screen display is adjusted.

Before the operation of detecting a first luminance information of a current environment, the instructions are executable by the processor to further perform an operation of:

setting the luminance threshold of environment luminance, a first environment luminance value, and a second environment luminance value in a camera, wherein the first environment luminance value is less than the second environment luminance value, and the second environment luminance value is less than the luminance threshold.

After the operation of comparing the first luminance information with a luminance threshold, the instructions are executable by the processor to further perform an operation of:

turning off a screen fill light mode if the first luminance information is greater than or equal to the luminance threshold.

After the operation of turning off a screen fill light mode, the instructions are executable by the processor to further perform an operation of:

performing a first image processing procedure to the photo when the screen fill light mode is turned off.

The operation of compensating the luminance uniformity of a screen display includes:

adjusting the luminance uniformity of the screen display depending on luminance uniformity of the photo as 70% if the first luminance information is less than the first environment luminance value;

adjusting the luminance uniformity of the screen display depending on the luminance uniformity of the photo as 60% if the first luminance information is greater than the first environment luminance value and less than the second environment luminance value;

adjusting the luminance uniformity of the screen display depending on the luminance uniformity of the photo as 50% if the first luminance information is greater than the second environment luminance value and less than the luminance threshold.

The second image processing procedure excludes image processing algorithms of a dark corner processing module.

The first image processing procedure includes image processing algorithms of a dark corner processing module.

An optical filter is in front of a camera when the photo is taken, and lights processed by the optical filter and entered into the camera become lights with luminance uniformity of light source.

The optical filter is a frosted sheet.

The luminance uniformity of the screen display is an inverse ratio to the luminance uniformity of the photo.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A mobile terminal, comprising:
a processor;
a memory, configured for storing data and instructions executable by the processor to perform following operations:
setting a luminance threshold of environment luminance, a first environment luminance value, and a second environment luminance value in a camera, wherein the first environment luminance value is less than the second environment luminance value, and the second environment luminance value is less than the luminance threshold;
detecting a first luminance information of a current environment;
comparing the first luminance information with the luminance threshold;
compensating luminance uniformity of a screen display if the first luminance information is less than the luminance threshold; and
performing a second image processing procedure to a photo after the luminance uniformity of the screen display is adjusted.

2. The mobile terminal according to claim 1, wherein after the operation of comparing the first luminance information with a luminance threshold, the instructions are executable by the processor to further perform an operation of:
turning off a screen fill light mode if the first luminance information is greater than or equal to the luminance threshold.

3. The mobile terminal according to claim 2, after the operation of turning off the screen fill light mode, the instructions are executable by the processor to further perform an operation of:
performing a first image processing procedure to the photo when the screen fill light mode is turned off.

4. The mobile terminal according to claim 1, the operation of compensating the luminance uniformity of the screen display comprises:
adjusting the luminance uniformity of the screen display depending on luminance uniformity of the photo as 70% if the first luminance information is less than the first environment luminance value;
adjusting the luminance uniformity of the screen display depending on the luminance uniformity of the photo as 60% if the first luminance information is greater than the first environment luminance value and less than the second environment luminance value; and
adjusting the luminance uniformity of the screen display depending on the luminance uniformity of the photo as 50% if the first luminance information is greater than the second environment luminance value and less than the luminance threshold.

5. The mobile terminal according to claim 3, wherein the first image processing procedure comprises image processing algorithms of a dark corner processing module.

6. The mobile terminal according to claim 1, wherein an optical filter is in front of a camera when the photo is taken, and lights processed by the optical filter and entered into the camera become lights with luminance uniformity of light source.

7. The mobile terminal according to claim 4, wherein the luminance uniformity of the screen display is an inverse ratio to the luminance uniformity of the photo.

8. A screen fill light photographing method for a mobile terminal, comprising:
setting a luminance threshold of environment luminance, a first environment luminance value, and a second environment luminance value in a camera; wherein the first environment luminance value is less than the second environment luminance value, and the second environment luminance value is less than the luminance threshold;
detecting a first luminance information of a current environment;
comparing the first luminance information with the luminance threshold, and controlling an on or off state of a screen fill light mode based on a result of the comparation between the first luminance information and the luminance threshold; and
performing a corresponding image processing procedure to a photo based on the state of the screen fill light mode.

9. The method according to claim 8, wherein the step of comparing the first luminance information with a luminance threshold, and controlling an on or off state of a screen fill light mode based on a result of the comparation between the first luminance information and the luminance threshold comprises:
comparing the first luminance information with the luminance threshold;
turning on the screen fill light mode and displaying a screen display if the first luminance information is less than the luminance threshold; and
turning off the screen fill light mode if the first luminance information is greater than or equal to the luminance threshold.

10. The method according to claim 8, wherein the step of performing a corresponding image processing procedure to a photo based on the state of the screen fill light mode comprises:
performing a first image processing procedure to the photo when the screen fill light mode is turned off; and
adjusting fill light to a screen display through inverse luminance compensation when the screen fill light mode is turned on and performing a second image processing procedure to the photo after the adjustment is finished.

11. The method according to claim 10, wherein the inverse luminance compensation comprises:
displaying a first screen display after the screen display is performed the inverse luminance compensation if the first luminance information is less than the first environment luminance value;
displaying a second screen display after the screen display is performed the inverse luminance compensation if the first luminance information is greater than the first environment luminance value and less than the second environment luminance value; and
displaying a third screen display after the screen display is performed the inverse luminance compensation if the first luminance information is greater than the second environment luminance value and less than the luminance threshold.

12. The method according to claim 10, wherein the first image processing procedure comprises image processing algorithms of a dark corner processing module.

13. A screen fill light photographing system for a mobile terminal, comprising:
- one or more processors;
- a memory; and
- one or more programs, stored in the memory and executable by the processor, comprising:
  - a setting module, configured for setting a luminance threshold of environment luminance, a first environment luminance value, and a second environment luminance value in a camera; wherein the first environment luminance value is less than the second environment luminance value, and the second environment luminance value is less than the luminance threshold;
  - a luminance detecting module, configured for detecting a first luminance information of a current environment;
  - a comparing judgment module, configured for comparing the first luminance information with the luminance threshold, and controlling an on or off state of a screen fill light mode based on a result of the comparation between the first luminance information and the luminance threshold; and
  - an image processing module, configured for performing a corresponding image processing procedure to a photo based on the state of the screen fill light mode.

14. The system according to claim 13, wherein the comparing judgment module comprises:
- a luminance comparing unit, configured for comparing the first luminance information with the luminance threshold;
- a screen fill light unit, configured for turning on the screen fill light mode and displaying a screen display if the first luminance information is less than the luminance threshold; and
- a fill light turning off unit, configured for turning off the screen fill light mode if the first luminance information is greater than or equal to the luminance threshold.

15. The system according to claim 14, wherein the image processing module comprises:
- a first image processing module, configured for performing a first image processing procedure to the photo when the screen fill light mode is turned off; and
- a second image processing module, configured for adjusting fill light to a screen display through inverse luminance compensation when the screen fill light mode is turned on and performing a second image processing procedure to the photo after the adjustment is finished.

* * * * *